United States Patent [19]

Suda et al.

[11] Patent Number: 4,688,920
[45] Date of Patent: Aug. 25, 1987

[54] FOCUS STATE DETECTING SYSTEM

[75] Inventors: Yasuo Suda, Yokohama; Hiroshi Ohmura, Wako; Akira Ishizaki; Akira Akashi, both of Yokohama; Keiji Ohtaka, Tokyo, all of Japan

[73] Assignee: Canon Kabushiki Kaisha, Tokyo, Japan

[21] Appl. No.: 778,306

[22] Filed: Sep. 20, 1985

[30] Foreign Application Priority Data

Oct. 17, 1984 [JP] Japan .................................. 59-217971

[51] Int. Cl.⁴ ............................................... G03B 3/00
[52] U.S. Cl. .................................................... 354/406
[58] Field of Search ................................ 354/402–409, 354/429–432, 476–483, 219, 224, 225; 250/201, 204, 201 PF

[56] References Cited

U.S. PATENT DOCUMENTS 3,860,935 1/1975 Stauffer ................................ 354/407
4,357,086 11/1982 Shimomura et al. ................ 354/407
4,552,445 11/1985 Mukai et al. ......................... 354/406

Primary Examiner—W. B. Perkey
Attorney, Agent, or Firm—Fitzpatrick, Cella, Harper & Scinto

[57] ABSTRACT

A system for detecting the focus of an imaging lens relative to an object includes re-imaging means disposed on the imaging side of the imaging lens and having pupil dividing means for dividing the pupil of the imaging lens into a plurality of areas, the re-imaging means forming a secondary object image of the object from a light beam passed through the plurality of divided areas, an optical system disposed near the predetermined imaging plane of the imaging lens and having a reflecting surface for directing a primary object image of the object to the re-imaging means, and light-receiving means on which the secondary object image by the re-imaging means is formed.

11 Claims, 4 Drawing Figures

FOCUS STATE DETECTING SYSTEM

BACKGROUND OF THE INVENTION

1. Field of the Invention

This invention relates to a focus state detecting device in a camera or the like, and in particular to a focus state detecting device in which the pupil of the imaging lens of a camera is divided into a plurality of areas, a plurality of secondary object images are formed by light beams passed through said areas and the focus position of the imaging lens is detected from the relative positional relation between these secondary object images.

2. Description of the Prior Art

A conventional device of this type is disclosed in Japanese Laid-open Patent Application No. 95221/1977.

In such focus detecting device, in order to prevent light beams other than a focus detecting light beam, i.e., stray light, from entering photoelectric converting means to cause an error of measured distance, a field mask is provided on or near a primary imaging plane. The size and location of this field mask must be limited so that a plurality of images of the field mask formed by a re-imaging system do not overlap one another on the photoelectric converting means. Therefore, if an attempt is made to apply such focus detecting device to a single lens reflex camera, there is the disadvantage that the location of the focus detecting device is limited to the bottom of the camera or the entire device becomes bulky.

SUMMARY OF THE INVENTION

It is an object of the present invention to provide a focus detecting device using a re-imaging system which can prevent stray light without using the conventional field mask and which can be freely disposed in a camera.

It is another object of the present invention to make a portion corresponding to the conventional field mask into a reflecting surface and disposing optical means having this reflecting surface in the photo-taking optical path or in the optical path of the re-imaging system, thereby achieving simplification and compactness of the entire device.

It is still another object of the present invention to provide a system for detecting the focus state of an imaging lens relative to an object, said system including re-imaging means disposed on the imaging side of said imaging lens and having pupil dividing means for dividing the pupil of said imaging lens into a plurality of areas, said re-imaging means forming a secondary object image of the object from a light beam passed through said plurality of divided areas, an optical system disposed near the predetermined imaging plane of said imaging lens and having a reflecting surface for directing a primary object image of the object to said re-imaging means, and light-receiving means on which said secondary object image by said re-imaging means is formed.

It is yet still another object of the present invention to provide such a system which is incorporated in a camera.

It is a further object of the present invention to provide such a system which is incorporated in the finder portion of a camera and used for the focus detection of the camera.

It is still a further object of the present invention to provide such a system wherein the dimensions of said reflecting surface are determined so that a plurality of images formed on said light-receiving means by said re-imaging means do not overlap one another.

DESCRIPTION OF THE PREFERRED EMBODIMENTS

An embodiment of the present invention will hereinafter be described with reference to the drawings.

Figure 1:
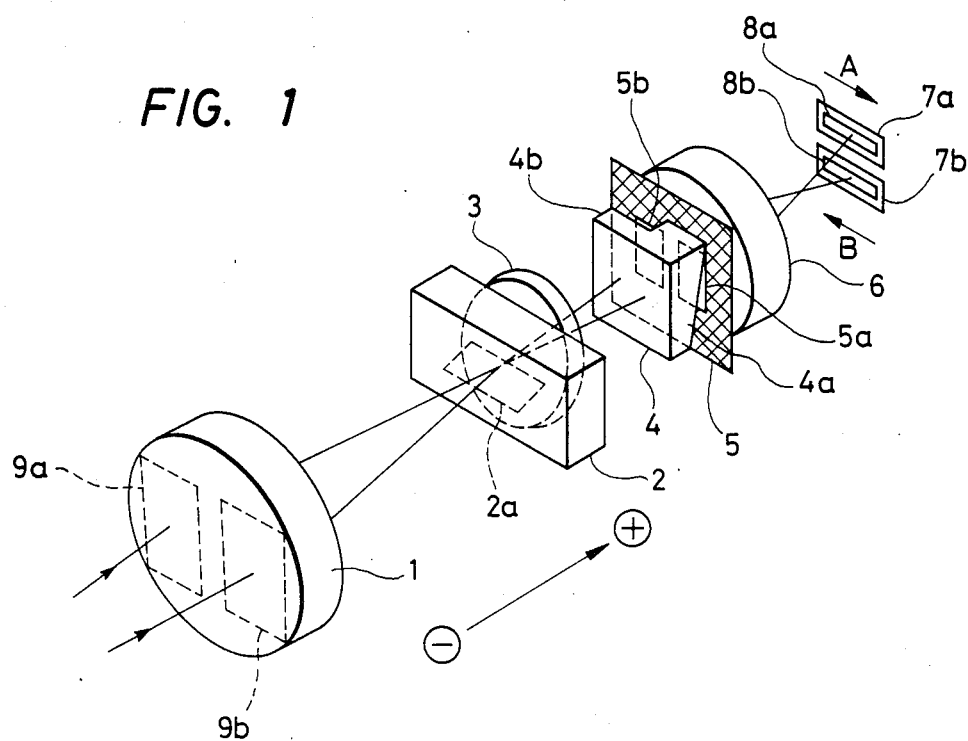
FIG. 1 illustrates the principle of the focus state detecting device according to the present invention.

FIG. 1 is a schematic view of an optical system according to an embodiment of the present invention. In FIG. 1, for simplicity, a light beam having entered optical means 2 having a reflecting surface 2a is depicted as not being reflected but by being transmitted through the optical means. In FIG. 1, reference numeral 1 designates a photo-taking lens, reference numeral 2 denotes optical means having a reflecting surface 2a, and reference numeral 3 designates a field lens. The optical means 2 is disposed near the predetermined imaging plane of the photo-taking lens 1. Reference numeral 4 denotes an image separating prism as pupil dividing means. The image separating prism has two prisms. Reference numeral 5 designates a stop for determining the F-number of the focus detecting optical system, and reference numeral 6 denotes a re-imaging lens. The stop 5 has two openings 5a and 5b. A light beam entering the opening 5a passes through a first inclined portion 4a of the image separating prism 4, and a light beam entering the opening 5b passes through a second inclined portion 4b of the image separating prism 4. The light beam having passed through the image separating prism 4 forms the image of the reflecting surface 2a on a photoelectric converting surface by the re-imaging lens 6. At this time, the light beam is bent in two directions by the image separating prism 4 and is therefore separated into two upper and lower images 7a and 7b. Photoelectric conversion element rows 8a and 8b are positioned within the images 7a and 7b, respectively, of the reflecting surface 2a to convert the brightness distribution of an object to be photographed into an electrical signal. The field lens 3 projects the stop 5 onto the vicinity of the exit pupil plane of the photo-taking lens and therefore, the images 7a and 7b of the reflecting surface 2a do not create an eclipse by the photo-taking lens. That is, the light beam forming the image 7a of the reflecting surface 2a passes through an area 9a on the pupil plane of the photo-taking lens, and the light beam forming the image 7b of the reflecting surface 2a passes through an area 9b on the pupil plane of the photo-taking lens. Accordingly, when the imaging position of the photo-taking lens has moved in the ⊕ direction from the predetermined imaging plane, the distribution of the quantity of light in the image 7a of the reflecting surface 2a moves in the direction of arrow A, and the distribution of the quantity of light in the image 7b of the reflecting surface 2a moves in the direction of arrow B. When the imaging position of the photo-taking lens has moved in the ⊖ direction, the direction of movement of the distribution of the quantity of light in the image of the reflecting surface 2a is reverse to what has been described above.

In the present embodiment, by detecting the phase difference between the photoelectric conversion outputs by the photoelectric conversion element rows 8a and 8b, how much the actual imaging position of the photo-taking lens deviates from the predetermined imaging plane is detected.

Figure 2:
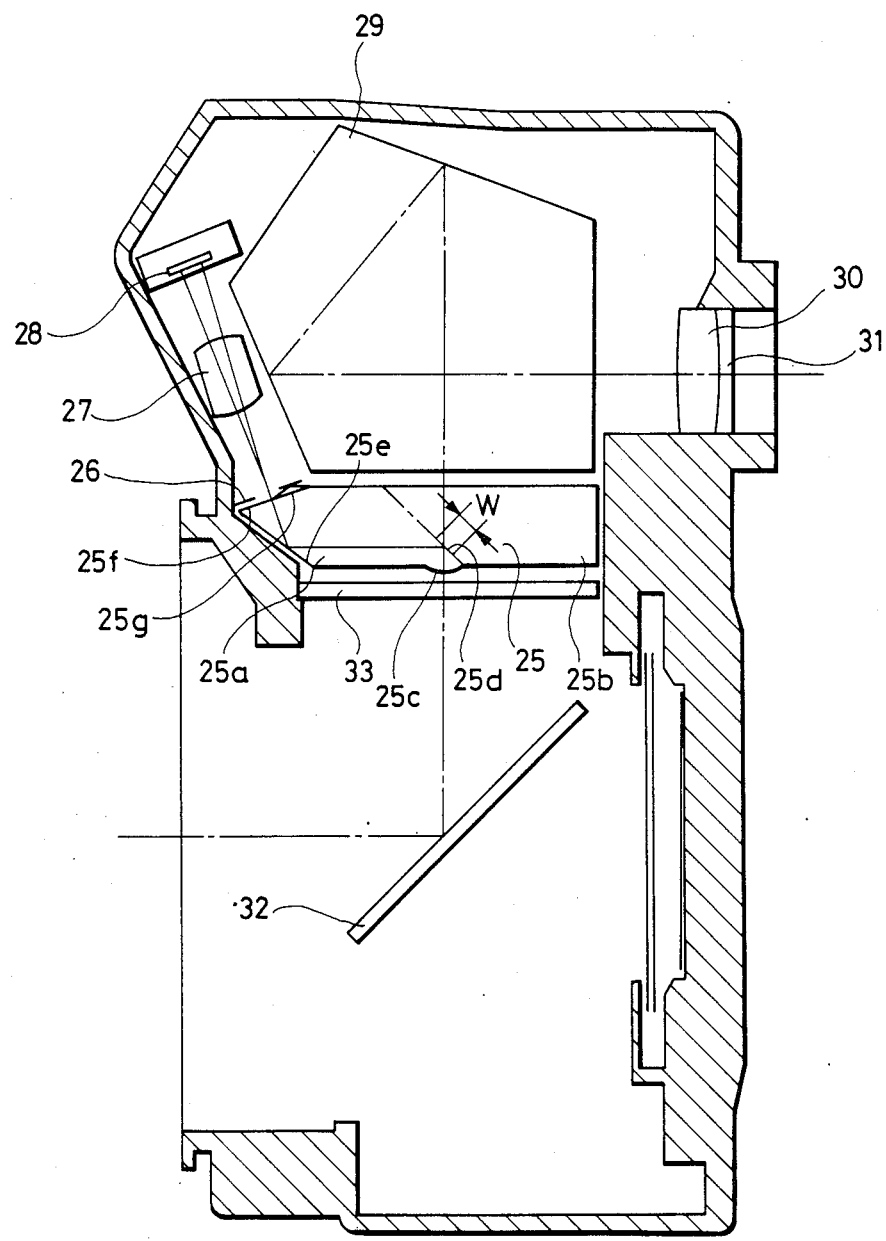
FIG. 2 is a cross-sectional view of a camera in which the focus state detecting device according to the present invention is incorporated.

FIG. 2 is a schematic view of an embodiment in which the focus detecting device of the present invention is disposed near the pentadach prism of the finder system. A light beam transmitted through the photo-taking lens is first bent upwardly by a main mirror 32 and forms a primary image on a focus plate 33. The center of the focus plate 33 is a transparent portion so that the light beam directed to the focus detecting optical system is not scattered. The light beam having passed through the focus plate 33 enters optical means 25 having a reflecting surface 25d and is divided into two directions, i.e., toward the finder optical system and toward the focus detecting optical system. The optical means 25 comprises two portions 25a and 25b formed of plastic and cemented together. The first portion 25a has a lens portion 25c, a reflecting surface 25d comprising a half-mirror portion, a reflecting portion 25e and prism portions 25f and 25g. The lens portion 25c and the prism portions 25f, 25g correspond to the field lens 3 and the inclined surfaces 4a and 4b, respectively, of the image separating prism 4 shown in FIG. 1.

The light beam reflected by the reflecting surface 25d of the optical means 25 passes through the reflecting surface 25e, the prism portions 25f, 25g and a re-imaging lens 27 to photoelectric converting means 28.

A stop 26, like the stop 5 shown in FIG. 1, has two openings, directs the light beams passed through different portions of the photo-taking lens to the re-imaging lens 27 and projects such light beams onto the photoelectric converting means 28.

On the other hand, the light beam having passed through the optical means 25 is used for observation via a pentaprism 29 and eyepieces 30 and 31.

In the present embodiment, the width W of the reflecting surface 25d is set so that when the reflecting surface 25d is formed as a plurality of images on the photoelectric conversion element row 28 by the re-imaging lens 27, those images do not overlap one another. Thereby, no other light beam than the light beam for focus detection enters each photoelectric conversion element row and high accuracy of focus detection is obtained.

The width W of the reflecting surface 25d is given by the following formula:

$$W \leq -\frac{\sqrt{2}}{\beta} D$$

where D is the separation width of the two images of the reflecting surface 25d on the photoelectric converting means 28, and β is the imaging magnification (lateral magnification) of the re-imaging lens 27.

Figure 3:
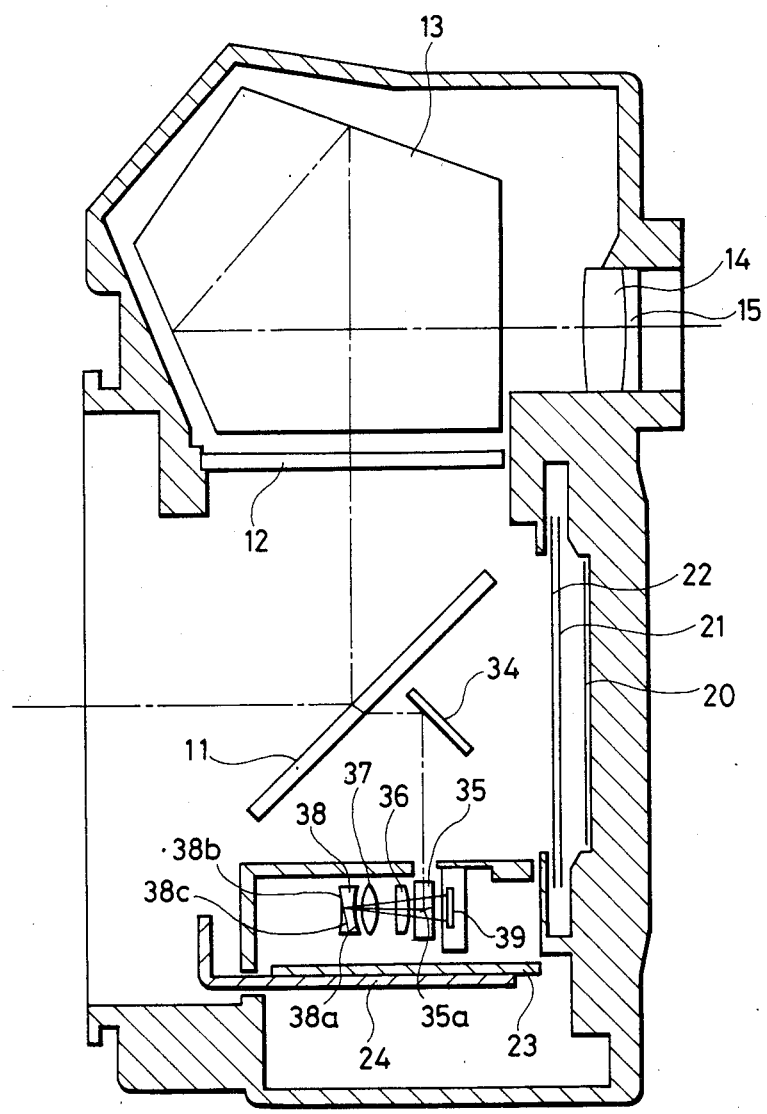
FIG. 3 is a cross-sectional view of a camera in which the focus state detecting device according to another embodiment of the present invention is incorporated.

FIG. 3 shows another embodiment of the present invention which is made more compact than the device according to the prior art. A light beam transmitted through the photo-taking lens is divided into a finder optical system and a focus detecting optical system by a main mirror 11. The light beam transmitted through a half-mirror portion forming the central portion of the main mirror 11 is bent downwardly by a sub-mirror 34 and enters optical means 35 serving also as optical path deflecting means.

The optical means 35 has a total reflection surface 35a, and the light beam reflected by the reflection surface 35a is reflected toward a field lens 36.

Thereafter, the light beam follows the optical path of a convex lens 37→the concave surface 38a of a concave lens→the image separating and reflecting surfaces 38b, 38c of the concave lens 38→the concave surface 38a of the concave lens 38→the convex lens 37→a field lens 36→the transmitting portion of the optical means 35→photoelectric converting means 39.

The reflection surface 35a is projected onto the photoelectric converting means 39 by the reciprocation of the light beam through the field lens 36, the convex lens 37 and the concave lens 38. At this time, the width of the reflection surface 35a is set so that, as in the embodiment of FIG. 2, the two images of the reflection surface 35a do not overlap each other on the photoelectric conversion element row.

Figure 4:
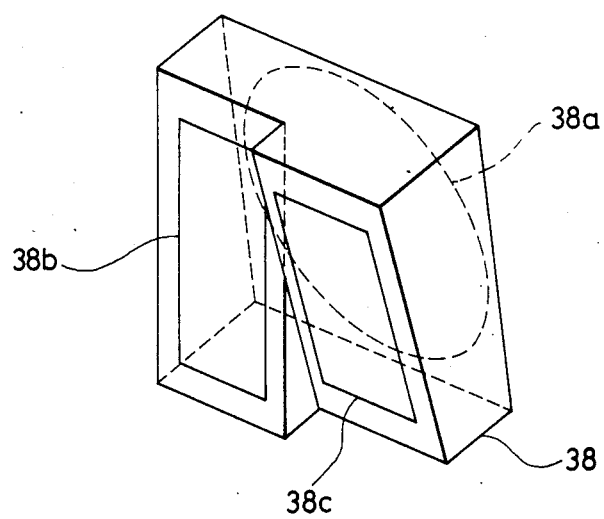
FIG. 4 is a perspective view showing the coating portion of the inclined reflecting surface of the focus detecting device shown in FIG. 3.

In the present embodiment, the image separating and reflecting surfaces 38b and 38c of the concave lens 38 are formed by such partial coating as shown in FIG. 4, and perform the function of the stop 5 shown in FIG. 1.

Further, in the present embodiment, the width of the reflection surface 35a is narrow and therefore, the light beam entering the photoelectric converting means 39 is not eclipsed by this reflection surface.

Thus, in the embodiment shown in FIG. 3, the entire optical system can be made as small as about ½ of the focus detecting device according to the prior art.

As described above, according to the present invention, the conventional field mask is not used but optical means having a reflecting surface is used, whereby the following effects are obtained:

(a) It has become possible to incorporate the focus state detecting device also in the portion wherein the field mask cannot be disposed, for example, the finder portion;

(b) Where the focus detecting device is incorporated in the finder system, no half-mirror portion is required in the main mirror and therefore, MTF of the finder system is reduced;

(c) It becomes possible to incorporate a TTL light output control element or the like in the lower portion of the mirror box and the layout of the interior of the camera is rationalized;

(d) No sub-mirror is required, and this leads to the simplification of the mechanism which in turn leads to a reduction in cost and a reduction in breakdown rate;

(e) A degree of freedom of layout is brought about, and it is possible to secure a sufficiently long optical path and an optically high accuracy focus detecting device is possible;

(f) The focus state detecting optical system having reciprocative optical paths on the opposite sides of the total reflection part as shown in FIG. 4 becomes possible and compactness of the system becomes easy to realize; and (g) In spite of being a focus state detecting device having reciprocative optical paths, no half-mirror is used in the light ray introducing portion and therefore, there is no loss of the quantity of light.

We claim:

1. An apparatus for detecting a focus adjusting state of an imaging lens, comprising:
   re-imaging means for forming a first and second objective image, the relative positional relationship between the first and second objective images being changed according to the focus adjusting state of the imaging lens;
   sensing means for forming a signal representing the focus adjusting state of the imaging lens, said sensing means having a first elongated area for sensing the distribution of the intensity of the first objective image and a second elongated area for sensing the distribution of the intensity of the second objective image; and
   light splitting means disposed near a predetermined imaging plane of the imaging lens for reflecting light and directing it to said re-imaging means, said light splitting means having a reflecting surface whose shape causes the light flux to be limited such that the light flux forming the first objective image is prevented from entering said second area and the light flux forming the second objective image is prevented from entering said first area.

2. An apparatus according to claim 1, wherein said reflecting surface is a half-transmitting mirror.

3. An apparatus according to claim 1, wherein said apparatus further comprises a field lens adjacent to said light splitting means.

4. An apparatus according to claim 1, further comprising light path selection means for selecting either of a first and second light paths and said reflecting surface is disposed on said first light path.

5. An apparatus according to claim 4, further comprising a view finder disposed on said first light path.

6. An apparatus according to claim 4, wherein said light path selection means is a main mirror of a camera.

7. An apparatus according to claim 1, wherein the following formula is satisfied:

$$W \leq \frac{\sqrt{2}}{\beta} D$$

where D is the separation width of the first and second objective images, $\beta$ is lateral magnification of said re-imaging means and W is the width of said reflecting surface.

8. A camera having a device for detecting a focus adjusting state of an imaging lens, comprising:
   a main mirror for dividing a light path of the imaging lens into first and second light paths and selecting either of the first and second light paths;
   a light splitter disposed near a predetermined imaging plane of the imaging lens and on the first light path;
   a viewfinder disposed on either of the first and second light paths;
   re-imaging means for forming a first and second objective image, the relative positional relationship between said first and second objective images being changed according to the focus adjusting state of the imaging lens; and
   sensing means for forming a signal representing the focus adjusting state of the imaging lens, said sensing means having a first elongated area for sensing the distribution of the intensity of the first objective image and a second elongated area for sensing the distribution of the intensity of the second objective image, wherein said light splitter reflects the light and directs it to said re-imaging means, said light splitter having a reflecting surface whose shape causes the light flux to be limited such that the light flux forming the first objective image is prevented from entering said second area and the light flux forming the second objective image is prevented from entering said first area.

9. A camera according to claim 8, further comprising a field lens adjacent to said light split means.

10. A camera according to claim 8, wherein said light splitter is disposed between said main mirror and said viewfinder.

11. A camera according to claim 8, wherein the following formula is satisfied:

$$W \leq \frac{\sqrt{2}}{\beta} D$$

where D is the separation width of the first and second objective images, $\beta$ is lateral magnification of said re-imaging means and W is the width of said reflecting surface.

* * * * *